United States Patent Office 3,144,454
Patented Aug. 11, 1964

3,144,454
3-HALOGENO, 4-NITRO, 6-LOWER ALKYL-PYRIDAZINE-1-OXIDE
Hideo Kano, Marutamachi-agaru, Koromodana-dori, Kamikyo-ku, Kyoto-shi, and Masaru Ogata, Sumiyoshi-cho, Higashinada-ku, Kobe-shi, Japan, assignors to Shionogi & Co., Ltd., Osaka, Japan
No Drawing. Filed Sept. 6, 1962, Ser. No. 221,885
Claims priority, application Japan Feb. 26, 1962
7 Claims. (Cl. 260—250)

The present invention relates to pyridazine derivatives. More particularly, it relates to the 3-halogeno-4-nitro-6-alkylpyridazine-1-oxides corresponding to the following general formula:

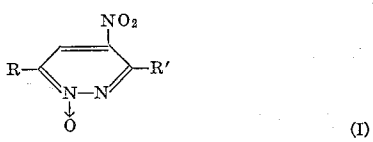
(I)

wherein R is lower alkyl (e.g., methyl, ethyl, propyl, butyl) and R' is halogen (e.g., chlorine, bromine, iodine), and process for their production.

The process according to the present invention comprises reacting the 3-halogeno-6-alkylpyridazine-1-oxide corresponding to the following formula:

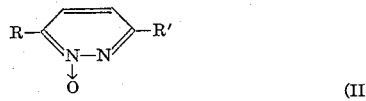
(II)

wherein R and R' have each the same significance as designated above, with a nitrating agent such as nitric acid, a mixture of nitric acid and sulfuric acid, a combination of an inorganic nitrate (e.g., sodium nitrate, potassium nitrate) with sulfuric acid and nitrogen dioxide, if necessary, in a suitable medium such as sulfuric acid, glacial acetic acid and nitrobenzene to give the compound I.

The starting compound II can be prepared according to the following scheme:

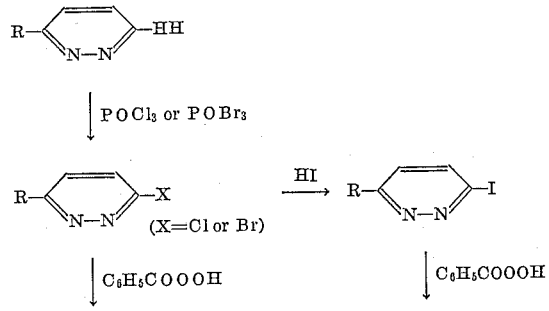

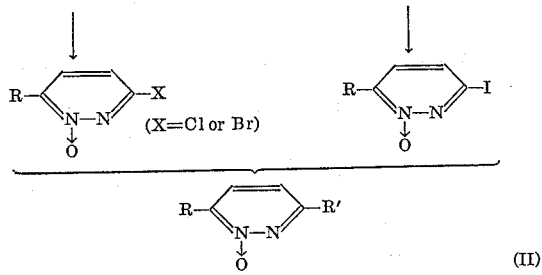
(II)

[Overend et al.: J. Chem. Soc., 239 (1947)]

wherein R and R' have each the same significance as designated above.

Of the said nitrating agents, the use of a mixture of nitric acid and sulfuric acid is the most preferable, and a typical procedure is illustratively set forth as follows:

The compound II is added to a mixture of fuming nitric acid and conc. sulfuric acid while cooling, and then heated on a water bath for several hours. The reaction mixture is poured into ice-water and shaken with a water-immiscible solvent such as dichloromethane, chloroform and carbon tetrachloride. Removing the solvent from the solvent layer, there is obtained the compound I.

The 3-halogeno-4-nitro-6-alkylpyridazine-1-oxides corresponding to Formula I show broad antimicrobial spectra against a variety of microorganisms, especially fungi. Thus, the in vitro sensitivity of bacteria and fungi to the compound I was determined by an agar streak dilution method. Serial two-fold dilutions of the compound I were prepared in appropriate media and the surface of the agar was streaked with suitable dilutions of young cultures. The minimum inhibitory concentrations were found for each organism as the lowest concentration of the compound I at which there was no visible growth of bacteria and fungi. For comparison, tests were also run using the heretofore known anti-fungal agents, i.e., griseofulvin and trichomycin.

TABLE I.—ANTIBACTERIAL ACTIVITY OF 3-HALOGENO - 4 - NITRO - 6 - ALKYLPYRIDAZINE-1-OXIDES

[As determined by agar-streak method on peptone-meat extract agar, readings after 48 hours at 37° C.]

| Test organisms | Minimum inhibitory concentration (mcg./ml.) | | |
|---|---|---|---|
| | 3-chloro-6-methyl | 3-bromo-6-methyl | 3-iodo-6-methyl |
| Shigella dysenteriae | 5.0 | 5.0 | 5.0 |
| Shigella paradysenteriae | 20.0 | 20.0 | 10.0 |
| Salmonella typhosa | 20.0 | 20.0 | 20.0 |
| Salmonella paratyphi A | 10.0 | 10.0 | 5.0 |
| Escherichia coli | 50.0 | 20.0 | 20.0 |
| Pseudomonas aeruginosa | >50.0 | >50.0 | >50.0 |
| Klebsiella pneumoniae | 20.0 | 20.0 | 10.0 |
| Bacillus subtilis, PCI-219 | 5.0 | 5.0 | 1.0 |
| Bacillus anthracis | 2.0 | 5.0 | 2.0 |
| Staphylococcus aureus 209 P | 20.0 | 20.0 | 5.0 |
| Sarcina lutea | 20.0 | 20.0 | 10.0 |

TABLE II.—ANTIFUNGAL ACTIVITY OF 3-HALOGENO - 4 - NITRO - 6 - ALKYLPYRIDAZINE - 1-OXIDES

[As determined by agar-streak method on 2% glucose-Sabouraud's agar]

| Test organisms | Minimum inhibitory concentration (mcg./ml.) | | | | |
|---|---|---|---|---|---|
| | 3-halogeno-4-nitro-6-alkyl-pyridazine-1-oxide | | | Griseo-fulvin | Tricho-mycin |
| | 3-chloro-6-methyl | 3-bromo-6-methyl | 3-iodo-6-methyl | | |
| Trichophyton pedis | 1.6 | 1.6 | 0.8 | 6.3 | 25.0 |
| Trichophyton purpureum | 0.8 | 3.1 | 0.8 | 3.1 | 50.0 |
| Trichophyton rubrum | 0.8 | 1.6 | 0.8 | 1.6 | 12.5 |
| Trichophyton gypseum | 0.8 | 1.6 | 0.8 | 6.3 | 100.0 |
| Trichophyton mentagrophytes | 0.8 | 1.6 | 0.8 | 6.3 | 50.0 |
| Trichophyton interdigitale | 3.1 | 3.1 | 3.1 | 12.5 | 100.0 |
| Candida albicans | 100.0 | 100.0 | 100.0 | >100.0 | 1.6 |
| Candida tropicalis | 100.0 | 100.0 | 100.0 | >100.0 | 1.6 |
| Aspergillus glaucus | 1.6 | 1.6 | 1.6 | >100.0 | 0.8 |
| Aspergillus oryzae | 6.3 | 6.3 | 6.3 | >100.0 | 12.5 |
| Aspergillus niger | 50.0 | 50.0 | 50.0 | >100.0 | 3.1 |
| Penicillium digitatum | 3.1 | 3.1 | 1.6 | >100.0 | 0.8 |
| Rhodotorula sp | 50.0 | 50.0 | 100.0 | >100.0 | 1.6 |
| Saccharomyces cerevisiae | 25.0 | 12.5 | 25.0 | >100.0 | 0.8 |
| Torula sp | 25.0 | 25.0 | 50.0 | >100.0 | 0.8 |

NOTE.—Trichophyton, readings after 10 days at 28° C; Aspergillus and Penicillium readings after 3 days at 28° C.; Candida and Yeast, readings after 2 days at 28° C.

As listed in Tables I and II, the 3-halogeno-4-nitro-6-alkyl-pyridazine-1-oxides corresponding to Formula I are active against bacteria and fungi. Although their antibacterial activity is medial, their antifungal activity is stronger and/or broader than that of griseofulvin and trichomycin. Particularly, their high activity against various species of Trichophyton is noteworthy. Determination of fungicidal activity was accomplished by placing, for instance, 3 - chloro - 4 - nitro - 6 - methylpyridazine - 1 - oxide in contact with cells of Trichophyton interdigitale in sterile saline solution. After the periods of contact, the cells were washed thrice with sterile saline solution and subcultures were made at intervals by an inoculating loop on glucose-Sabouraud's agar for growth observations.

TABLE III.—FUNGICIDAL ACTION OF 3-CHLORO- 4 - NITRO - 6 - METHYLPYRIDAZINE - 1 - OXIDE AGAINST CELLS OF TRICHOPHYTON INTERDIGITALE SUSPENDED IN SALINE SOLUTION

| Hours of contact | Growth of Trichophyton interdigitale* Concentration (mg./ml.) | | | | | |
|---|---|---|---|---|---|---|
| | 100 | 50 | 25 | 12.5 | 6.3 | Control † |
| 4 | − | ± | + | ++ | +++ | +++ |
| 8 | − | ± | + | ++ | +++ | +++ |
| 24 | − | − | ± | + | ++ | +++ |
| 48 | − | − | ± | ± | + | +++ |

NOTES:
*Subcultures incubated at 37° C. Final readings made after 7 days.
†Sterile saline was used as the control.
−, No growth.
±, +, ++ and +++, Slight to full growth.

As listed in Table III, the compound I is a remarkable fungicidal agent against Trichophyton. Accordingly, the 3-halogeno-4-nitro-6-alkylpyridazine-1-oxides corresponding to Formula I are useful as fungistatic and fungicidal agents, especially in the treatment of superficial mycoses due to Trichophyton. For instance, they can be used as externally applicable medicaments for controlling the infections caused by pathogenic Trichophyton such as trichophytia pompholyciformis, trichophytia eczematosa and trichophytia maculovesiculosa in the form of creams, ointments, solutions, suspensions, powders and the like.

Practical and presently preferred embodiments of the present invention are illustrated by the following examples. The abbreviations used in these examples are intended to have the following meanings: ml., millilitre(s); mg., milligram(s); and ° C., degrees centigrade. Other abbreviations have each a conventional meaning.

Example 1

To a mixture of conc. sulfuric acid (2 ml.) and fuming nitric acid (0.5 ml.), there is added 3-chloro-6-methyl-pyridazine-1-oxide (500 mg.) while ice-cooling, and the resultant mixture is heated for 6 hours on a water bath. Then, the reaction mixture is poured into ice-water and shaken with chloroform. Removing the solvent from the chloroform layer, the resulting substance is crystallized from benzene to give 3-chloro-4-nitro-6-methyl-pyridazine-1-oxide (210 mg.) as needles melting at 103 to 103.5° C.

Analysis.—Calcd. for $C_5H_4O_3N_3Cl$: C, 31.66; H, 2.12; N, 22.17. Found: C, 31.49; H, 2.30; N, 22.05.

The starting material of this example, 3-chloro-6-methylpyridazine-1-oxide, can be produced by reacting 3-chloro-6-methylpyridazine [Overend et al.: J. Chem. Soc., 239 (1947)] with perbenzoic acid in chloroform at 30° C.

Example 2

To a mixture of conc. sulfuric acid (2 ml.) and fuming nitric acid (1 ml.), there is added 3-bromo-6-methyl-pyridazine-1-oxide (400 mg.) while ice-cooling, and the resultant mixture is heated for 3 hours on a water bath. Then, the reaction mixture is poured into ice-water and shaken with chloroform. Removing the solvent from the chloroform layer, the resulting substance is crystallized from ethanol to give 3-bromo-4-nitro-6-methyl-pyridazine-1-oxide (190 mg.) as prisms melting at 123 to 124° C.

Analysis.—Calcd. for $C_5H_4O_3N_3Br$: C, 25.64; H, 1.71; N, 17.95. Found: C, 25.99; H, 1.93; N, 17.49.

The starting material of this example, 3-bromo-6-methylpyridazine-1-oxide, can be produced by reacting 3-hydroxy-6-methylpyridazine [Overend et al.: J. Chem. Soc., 239 (1947)] with phosphorus oxybromide at 60° C. and treating the resulting 3-bromo-6-methylpyridazine with perbenzoic acid in chloroform at 25° C.

Example 3

To a mixture of conc. sulfuric acid (2 ml.) and fuming nitric acid (0.5 ml.), there is added 3-iodo-6-methyl-pyridazine-1-oxide (500 mg.) while ice-cooling, and the resultant mixture is heated for 2.5 hours on a water bath. Then, the reaction mixture is poured into ice-water and shaken with chloroform. Removing the solvent from the chloroform layer, the resulting substance is crystallized from methanol to give 3-iodo-4-nitro-6-methylpyridazine-1-oxide (150 mg) as scales melting at 124 to 125° C.

*Analysis.*—Calcd. for $C_6H_7O_4N_3I$: C, 21.35; H, 1.42; N, 14.95. Found: C, 21.57; H, 1.51; N, 14.74.

The starting material of this example, 3-iodo-6-methylpyridazine-1-oxide, can be produced by reacting 3-chloro-6-methylpyridazine [Overend et al.: J. Chem. Soc., 239 (1947)] with conc. hydroiodic acid at 120° C. and treating the resulting 3-iodi-6-methylpyridazine with perbenzoic acid in chloroform at 25 C.

*Example 4*

25 kilograms of a topical cream for treating fungus infections of the skin or scalp are prepared from the following types and amounts of materials:

| | Grams |
|---|---|
| Stearic acid, N.F. | 5000 |
| Isopropyl myristate | 500 |
| 3-chloro-4-nitro-6-methylpyridazine-1-oxide | 62.5 |
| Methylparaben, U.S.P. | 25 |
| Triethanolamine, U.S.P. | 500 |
| Propylene glycol, U.S.P. | 2500 |
| Perfume, q.s. | |
| Deionized water, q.s. to 25,000 grams. | |

The stearic acid is melted and the isopropyl myristate mixed therein. The finely powdered 3-chloro-4-nitro-6-methylpyridazine-1-oxide is suspended in the mixture. The methylparaben is dissolved in part of the water at about 70° C., and the triethanolamine and propylene glycol are added to the aqueous solution. With constant stirring the aqueous solution is combined with the 3-chloro - 4 - nitro - 6 - methylpyridazine - 1 - oxide-stearic acid-isopropyl myristate mixture. The combination is stirred until the temperature reaches about 40° C. The perfume is added and any water loss replaced. Stirring is continued until congealing occurs. The cream is assayed for potency and filled into 5 g. tubes. The preparation is suitable for use in the treatment of moderately severe tinea barbae of the face of neck by direct application to infected areas of the skin twice a day.

*Example 5*

A tincture containing in each 1 ml. 20 mg. of 3-chloro-4-nitro-6-methylpyridazine-1-oxide is prepared from the following types and amounts of ingredients:

| | Grams |
|---|---|
| 3-chloro-4-nitro-6-methylpyridazine-1-oxide | 20 |
| Methyl salicylate | 20 |
| 22% aqueous ethanol, q.s. to 1000 millilitres. | |

Two applications of the tincture per day to feet infected with moderately severe athlete's foot would be suitable course of treatment until symptoms subside.

*Example 6*

A topical dusting powder suitable for the treatment of fungous infections on the foot or on other parts of the body is prepared from the following types and amounts of ingredients:

| | Grams |
|---|---|
| 3-chloro-4-nitro-6-methylpyridazine-1-oxide fine powder (200 mesh) | 10 |
| Zinc stearate | 350 |
| Bentonite | 640 |

Two applications of the powder per day to feet infected with moderately severe athlete's foot would be suitable course of treatment until symptoms subside.

What is claimed is:
1. 3-halogeno-4-nitro-6-lower alkylpyridazine-1-oxide.
2. 3-chloro-4-nitro-6-lower alkylpyridazine-1-oxide.
3. 3-bromo-4-nitro-6-lower alkylpyridazine-1-oxide.
4. 3-iodo-4-nitro-6-lower alkylpyridazine-1-oxide.
5. 3-chloro-4-nitro-6-methylpyridazine-1-oxide.
6. 3-bromo-4-nitro-6-methylpyridazine-1-oxide.
7. 3-iodo-4-nitro-6-methylpyridazine-1-oxide.

References Cited in the file of this patent

UNITED STATES PATENTS

| 2,524,802 | Hultquist et al. | Oct. 10, 1950 |
| 2,798,869 | Druey et al. | July 9, 1957 |
| 2,994,637 | Bimber | Aug. 1, 1961 |
| 3,005,750 | Fluck et al. | Oct. 24, 1961 |

OTHER REFERENCES

Itai et al.: J. Pharm. Soc., Japan, vol. 75 (1955), pp. 966–9.

RSI, p. 45 (abstracted at C.A. 50, 4970 (1956)).

Nakagome: J. Pharm. Soc., Japan, vol. 82, No. 2 (1962), pp. 253–56.